United States Patent
Wu et al.

(10) Patent No.: US 10,349,086 B2
(45) Date of Patent: Jul. 9, 2019

(54) PICTURE COMPRESSION METHOD FOR DISPLAY PANEL AND PICTURE COMPRESSION APPARATUS

(71) Applicant: Shenzhen China Star Optoelectronics Technology Co., Ltd., Shenzhen, Guangdong (CN)

(72) Inventors: Jingjing Wu, Guangdong (CN); Dongsheng Guo, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 331 days.

(21) Appl. No.: 15/313,661

(22) PCT Filed: Sep. 14, 2016

(86) PCT No.: PCT/CN2016/099082
§ 371 (c)(1),
(2) Date: Nov. 23, 2016

(87) PCT Pub. No.: WO2018/028022
PCT Pub. Date: Feb. 15, 2018

(65) Prior Publication Data
US 2018/0160150 A1 Jun. 7, 2018

(30) Foreign Application Priority Data
Aug. 8, 2016 (CN) .......................... 2016 1 0643113

(51) Int. Cl.
*H04N 19/00* (2014.01)
*H04N 19/85* (2014.01)
(Continued)

(52) U.S. Cl.
CPC ............... *H04N 19/85* (2014.11); *G09G 3/20* (2013.01); *G09G 3/36* (2013.01); *G09G 5/005* (2013.01);
(Continued)

(58) Field of Classification Search
CPC .... H04N 19/85; H04N 19/132; H04N 19/176; G09G 3/20; G09G 3/36; G09G 5/005;
(Continued)

(56) References Cited

U.S. PATENT DOCUMENTS 5,929,924 A * 7/1999 Chen ...................... G09G 5/006
348/458
7,262,784 B2 * 8/2007 Wang ................... G09G 3/3611
345/3.3
(Continued)

FOREIGN PATENT DOCUMENTS

CN 101105932 A 1/2008
CN 201417597Y A 3/2010
(Continued)

*Primary Examiner* — Sean T Motsinger
(74) *Attorney, Agent, or Firm* — Andrew C. Cheng

(57) ABSTRACT

The present disclosure provides a picture compression method for the display panel, the method includes: obtaining the number of occluded sub-pixels in the display area; deleting the pixel data having the same number of the occluded sub-pixels; integrated processing the undeleted pixel data, so that the undeleted pixel data are one-to-one correspondence with the un-occluded sub-pixels; providing the integrated processed undeleted pixel data to the un-occluded sub-pixels, so that the aspect ratio of the picture displayed by the un-occluded sub-pixels is as same as the aspect ratio of the picture displayed by the all of the sub-pixels. The present disclosure further provides a picture compression apparatus of the display panel. The disclosure realizes the purpose of the display screen compression, so as
(Continued)

to solve the problem that the screen displayed by the display area is not complete due to the covering of the display area by the mechanism frame.

8 Claims, 3 Drawing Sheets

(51) Int. Cl.
*G09G 3/20* (2006.01)
*G09G 3/36* (2006.01)
*H04N 19/176* (2014.01)
*H04N 19/132* (2014.01)
*G09G 5/391* (2006.01)
*G09G 5/00* (2006.01)

(52) U.S. Cl.
CPC ..... *G09G 5/391* (2013.01); *G09G 2310/0232* (2013.01); *G09G 2340/0407* (2013.01); *H04N 19/132* (2014.11); *H04N 19/176* (2014.11)

(58) Field of Classification Search
CPC ........... G09G 5/391; G09G 2310/0232; G09G 2310/0407
See application file for complete search history.

(56) References Cited

U.S. PATENT DOCUMENTS

| | | | | |
|---|---|---|---|---|
| 7,864,203 B1* | 1/2011 | Fear | ...................... | G09G 5/003 345/428 |
| 9,298,413 B1* | 3/2016 | Karve | ................... | G06F 3/1446 |
| 10,109,232 B2* | 10/2018 | Rappoport | ............... | G09G 3/20 |
| 2002/0180887 A1* | 12/2002 | Kim | ..................... | H04N 7/0122 348/556 |
| 2006/0012616 A1* | 1/2006 | Paek | ........................ | G09G 3/20 345/698 |
| 2006/0279478 A1* | 12/2006 | Ikegami | ............... | G09G 3/2025 345/30 |
| 2007/0002142 A1* | 1/2007 | Lim | ........................ | H04N 17/04 348/181 |
| 2007/0120763 A1* | 5/2007 | De Paepe | ........... | G06F 3/03547 345/1.3 |
| 2008/0239336 A1* | 10/2008 | Tanabe | .................. | G02B 26/123 358/1.7 |
| 2009/0109125 A1* | 4/2009 | Young | ................... | G06F 3/1446 345/1.3 |
| 2009/0309808 A1* | 12/2009 | Swingler | ............... | G06F 3/1423 345/1.3 |
| 2010/0033402 A1* | 2/2010 | Yoshida | ................ | G06F 3/1446 345/1.3 |
| 2010/0238090 A1* | 9/2010 | Pomerantz | .......... | G02F 1/13336 345/1.3 |
| 2011/0149166 A1* | 6/2011 | Botzas | ................... | H04N 5/202 348/649 |
| 2011/0164065 A1* | 7/2011 | Mate | ..................... | G06F 3/1446 345/676 |
| 2012/0084673 A1* | 4/2012 | Sirpal | .................. | G06F 1/1616 715/761 |
| 2015/0331654 A1* | 11/2015 | Luttrell | ................. | G06F 3/1446 345/1.3 |
| 2016/0233283 A1* | 8/2016 | Kim | ..................... | H01L 27/3269 |
| 2017/0061843 A1* | 3/2017 | Zhao | ..................... | G09G 3/2003 |
| 2017/0278906 A1* | 9/2017 | Song | .................... | H01L 27/326 |
| 2018/0160150 A1* | 6/2018 | Wu | ........................ | H04N 19/85 |
| 2018/0197480 A1* | 7/2018 | Choi | .................... | G09G 3/3266 |

FOREIGN PATENT DOCUMENTS

| | | |
|---|---|---|
| CN | 103546715 A | 1/2014 |
| CN | 103618943 A | 3/2014 |
| JP | 2007325131 A | 12/2007 |

* cited by examiner

PICTURE COMPRESSION METHOD FOR DISPLAY PANEL AND PICTURE COMPRESSION APPARATUS

FIELD OF THE DISCLOSURE

The present disclosure relates to a display technology field, and more particularly to a picture compression method for display panel and a picture compression apparatus.

BACKGROUND OF THE DISCLOSURE

With the development of optoelectronics and semiconductor technology, the flat panel display is also flourished, and in many flat panel displays, the liquid crystal display (LCD) due to high space utilization efficiency, low power consumption, no radiation and low electromagnetic interference, and many other superior features, has been applied to all aspects of production and life.

In the assembly process of the liquid crystal display, due to the area of the active area (AA) of the display panel (i.e. liquid crystal panel) manufactured by each panel manufacturers are different, the compatibility of the mechanism frame for press-assembling the liquid crystal panel and the backlight module together is low. For example, the area of the AA of the display panel manufactured by the A manufacturer is greater than the area of the AA of the display panel manufactured by the B manufacturer, so that when use the mechanism frame for press-assembling the display panel manufactured by the B manufacturer to press-assembling the display panel manufactured by the A manufacturer, the edge of the AA of the display panel manufactured by the A manufacturer will be occluded by the mechanism frame, resulting in the incomplete of the picture displayed by the LCD assembled by the display panel manufactured by the A manufacturer.

SUMMARY OF THE DISCLOSURE

To solve the above problem, the present disclosure provides a picture compression method for a display panel and a picture compression apparatus.

According to an aspect of the present disclosure, there is provided the picture compression method for the display panel, wherein the method includes: obtaining the number of occluded sub-pixels in the display area of the display panel; deleting the pixel data having the same number of the occluded sub-pixels in the display area; integrated processing the undeleted pixel data, so that the undeleted pixel data are one-to-one correspondence with the un-occluded sub-pixels in the display area; providing the integrated processed undeleted pixel data to the un-occluded sub-pixels in the display area, so that the aspect ratio of the picture displayed by the un-occluded sub-pixels in the display area is as same as the aspect ratio of the picture displayed by the all of the sub-pixels in the display area.

Alternatively, the method of obtaining the number of occluded sub-pixels in the display area of the display panel includes: obtaining the width of the pixel row area and the pixel column area which the display area of the display panel occluded and obtaining the length and the width of the sub-pixels in the display area; calculating the number of the occluded pixel row according to the width of the occluded pixel row area and the width of the occluded sub-pixel, and calculating the number of the occluded pixel column according to the width of the occluded pixel column area and the length of the sub-pixel; calculating the number of the occluded sub-pixels in the display area according to the calculated number of the occluded pixel row and the occluded pixel column and the resolution of the display panel.

Alternatively, the method of deleting the pixel data having the same number of the occluded sub-pixels in the display area includes: comparing the pixel data corresponding to the two adjacent sub-pixels on the each pixel rows; when the pixel data corresponding to the two adjacent sub-pixels on the each pixel rows are the same, deleting one of the pixel data, until the number of the deleted pixel data equal to the number of sub-pixels located on the occluded pixel row.

Alternatively, the method of deleting the pixel data having the same number of the occluded sub-pixels in the display area includes: comparing the pixel data corresponding to the two adjacent sub-pixels on the each pixel columns; when the pixel data corresponding to the two adjacent sub-pixels on the each pixel columns are the same, deleting one of the pixel data, until the number of the deleted pixel data equal to the number of sub-pixels located on the occluded pixel column.

Alternatively, the method of integrated processing the undeleted pixel data includes: inserting a virtual data or a black picture data with the same number of the occluded sub-pixel in the display area into the undeleted pixel data; integrated processing the undeleted pixel data and the inserted virtual data or black picture data, so that the inserted virtual data or black picture data are one-to-one correspondence with the occluded sub-pixels in the display area, and the undeleted pixel data are one-to-one correspondence with the un-occluded sub-pixels in the display area.

According to another aspect of the present disclosure, there is also provides a picture compression apparatus for the display panel, wherein the apparatus includes: a sub-pixel number acquisition module used to obtain the number of the occluded sub-pixel in the display area of the display panel; a pixel data removal module used to delete the pixel data having the same number of the occluded sub-pixels in the display area; a data integration processing module used to integrated processing the undeleted pixel data, so that the undeleted pixel data are one-to-one correspondence with the un-occluded sub-pixels in the display area; and an output module used to provide the integrated processed undeleted pixel data to the un-occluded sub-pixels in the display area, so that the aspect ratio of the picture displayed by the un-occluded sub-pixels in the display area is as same as the aspect ratio of the picture displayed by the all of the sub-pixels in the display area.

Alternatively, the sub-pixel number acquisition module includes: a size acquisition unit used to obtain the width of the occluded pixel row area and pixel column area of the display area of the display panel, and obtain the length and width of the sub-pixel in the display area; a number of rows and columns calculation unit used to calculate the number of the occluded pixel row according to the width of the occluded pixel row area and the width of the sub-pixel, and calculate the number of the occluded pixel column according to the width of the occluded pixel column area and the length of the sub-pixel; and a sub-pixel number calculation unit used to calculate the number of the occluded sub-pixel in the display area according to the calculated number of the occluded pixel row and pixel column and the resolution of the display panel.

Alternatively, the pixel data removal module includes: a first comparison unit used to compare the pixel data corresponding to the two adjacent sub-pixels on the each pixel rows; a first deletion unit used to delete one of the pixel data when the pixel data corresponding to the two adjacent sub-pixels on the each pixel rows are the same, until the number of the deleted pixel data equal to the number of sub-pixels located on the occluded pixel row.

Alternatively, the pixel data removal module includes: a second comparison unit used to compare the pixel data corresponding to the two adjacent sub-pixels on the each pixel columns; a second deletion unit used to delete one of the pixel data when the pixel data corresponding to the two adjacent sub-pixels on the each pixel columns are the same, until the number of the deleted pixel data equal to the number of sub-pixels located on the occluded pixel row.

Alternatively, the data integration processing module includes: a data insertion unit used to insert a virtual data or a black picture data with the same number of the occluded sub-pixel in the display area into the undeleted pixel data; a data integration unit used to integration process the undeleted pixel data and the inserted virtual data or black picture data, so that the inserted virtual data or black picture data are one-to-one correspondence with the occluded sub-pixels in the display area, and the undeleted pixel data are one-to-one correspondence with the un-occluded sub-pixels in the display area.

The disclosure realizes the purpose of the display screen compression, so as to solve the problem that the screen displayed by the display area is not complete due to the covering of the display area by the mechanism frame.

BRIEF DESCRIPTION OF THE DRAWINGS

The following description in conjunction with the accompanying drawings, the above and other aspects, features and advantages of the embodiments of the present disclosure will become more apparent from the accompanying drawings in which.

DETAILED DESCRIPTION OF PREFERRED EMBODIMENTS

Hereinafter, embodiments of the present disclosure will be described in detail with reference to the accompanying drawings. However, in many different forms and embodiments of the present disclosure, and the disclosure should not be construed as limited to the specific embodiments set forth herein. Rather, these embodiments are provided to explain the principles of the disclosure and its practical application, thereby others skilled in the art to understand the disclosure for various embodiments and various modifications suited to the particular intended application.

In the present embodiment, use the 1920×1080 resolution of the liquid crystal panel as an example of the display panel to describe the picture compression method for display panel and the picture compression apparatus of the present disclosure. Of course, it should be understood that the resolution of the liquid crystal panel is not limited to 1920×1080. In addition, as another embodiment of the present disclosure, an organic light emitting display panel (i.e. OLED panel) may also be used as an example.

Figure 1:
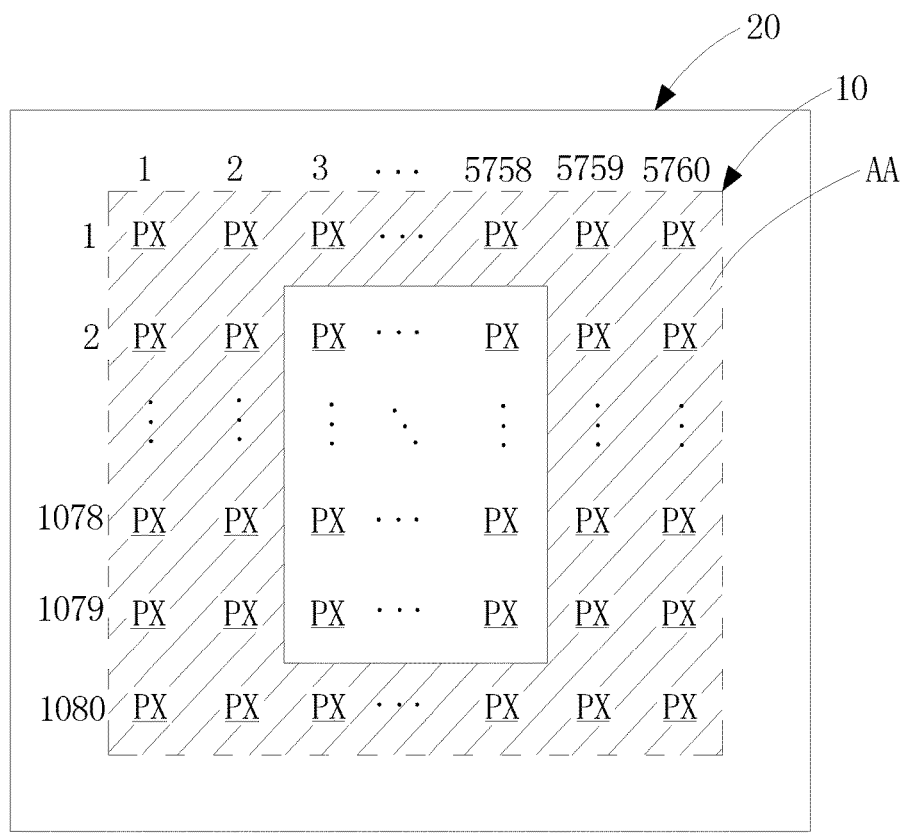
FIG. 1 is a schematic diagram of the liquid crystal panel pressed together by the mechanism frame according to the embodiment of the present disclosure.

FIG. 1 is a schematic diagram of the liquid crystal panel pressed together by the mechanism frame according to the embodiment of the present disclosure.

Please refer to FIG. 1, the liquid crystal panel 10 of the embodiment of the present disclosure includes the display area AA and the non-display area surrounding the AA (not shown). In the display area AA, the array arranges a plurality of sub-pixels PX. In the present embodiment, the sub-pixel PX may be the red sub-pixel, the blue sub-pixel or the green sub-pixel. Otherwise, in the present embodiment, a pixel is formed by the red sub-pixel, the green sub-pixel and the blue sub-pixel.

When the mechanism frame 20 pressing together the liquid crystal panel 10, due to the mechanism frame 20 occlude the edge of non-display area and display area AA, will occlude the picture displayed by the sub-pixel PX at the edge of the display area AA.

In the present embodiment, due to the resolution of the liquid crystal panel 10 is 1920×1080, arranges 1080 rows× 5760 (1920×3) columns sub-pixels in the display area AA. As an embodiment, the mechanism frame 20 occlude the 1st column, the 2nd column, the 5759th column, the 5760th column, the 1st row and the 1080th sub-pixel PX. In this way, in order to match the aspect ratio of the picture displayed in the area where the display area AA is not occluded by the mechanism frame 20 to the aspect ratio of the picture displayed in the display area AA, the picture displayed in the display area AA needs to be compressed, the compression process will be described in detail below.

Figure 2:
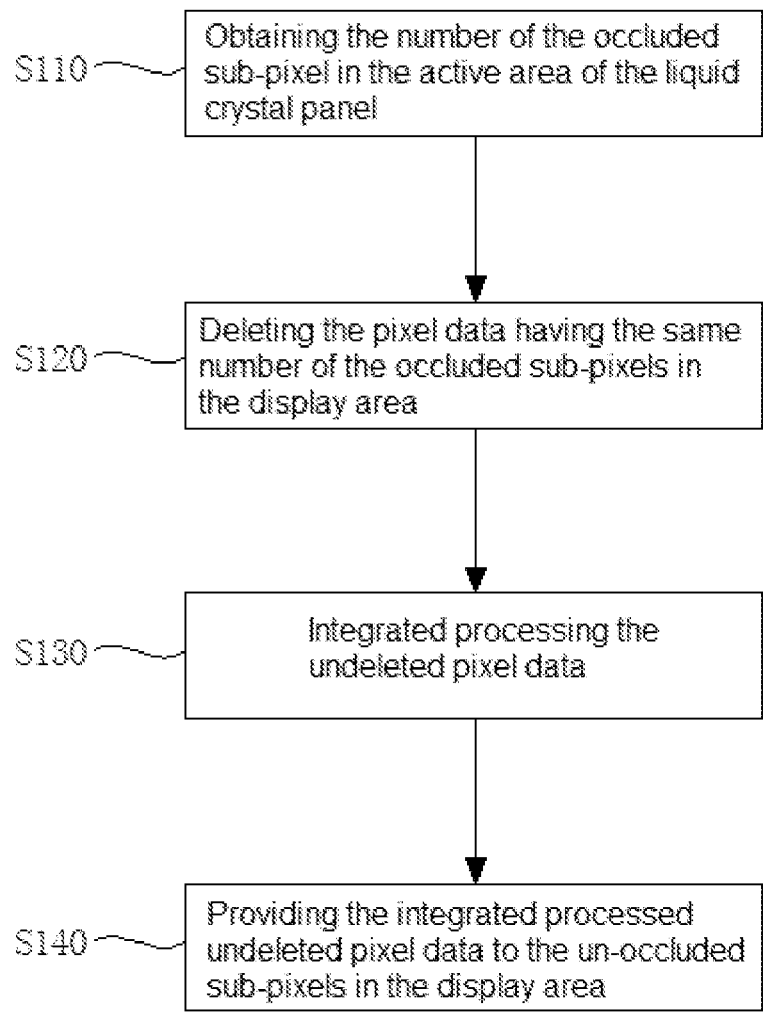
FIG. 2 is a flow chart of the picture compression method for the display panel according to the embodiment of the present disclosure.

FIG. 2 is a flow chart of the picture compression method for the display panel according to the embodiment of the present disclosure.

Please refer to FIG. 1 and FIG. 2, in the step S110, obtaining the number of the occluded sub-pixel PX in the display area AA of the liquid crystal panel 10.

Specifically, the specific method of implementing step S110 includes:

obtaining the width of the occluded pixel row area and pixel column area of the display area AA of the liquid crystal panel 10 (is shown as slash shadow in FIG. 1), and obtaining the length and width of the sub-pixel PX in the display area AA of the liquid crystal panel 10. That is to say, obtaining the width W1 of the occluded first pixel column area (which includes the area occupied by the 1st column sub-pixel PX and the 2nd column sub-pixel PX), the width W2 of the occluded second pixel column area (which includes the area occupied by the 5759th column sub-pixel PX and 5760th column sub-pixel PX), the width L1 of the occluded first pixel row area (which includes the area occupied by the 1st row sub-pixel PX), the width L2 of the occluded second pixel row area (which includes the area occupied by the 1080th row sub-pixel PX) and obtaining the length L and the width W of the sub-pixel PX.

calculating the number of the occluded pixel row according to the width of the occluded pixel row area and the width of the occluded sub-pixel PX, and calculating the number of the occluded pixel column according to the width of the occluded pixel column area and the length of the sub-pixel PX. That is to say, calculating the number of the occluded pixel column by the width W1 of the occluded first pixel column area divided by the width W of the sub-pixel PX, i.e. two columns of the first column and the second column; calculating the number of the occluded pixel column by the width W2 of the occluded second pixel column area divided by the width W of the sub-pixel PX, i.e. two columns of the 5759th column and the 5760th column; calculating the number of the occluded pixel row by the width L1 of the occluded first pixel row area divided by the length L of the sub-pixel PX, i.e. one row of the first row; calculating the number of the occluded pixel row by the width L2 of the occluded second pixel row area divided by the length L of the sub-pixel L, i.e. one row of the 1080th row.

calculating the number of the occluded sub-pixel PX by the calculated number of the occluded pixel column and pixel row and the resolution of the liquid crystal panel 10. That is to say, the resolution of the liquid crystal panel 10 is 1920×1080, i.e. in the display area AA, the number of the each column sub-pixel PX is 1080, and the number of the each row sub-pixel PX is 5760. Due to the intersection of one row sub-pixel PX and one column sub-pixel PX coincides a sub-pixel PX, subtracting the coincided sub-pixel is necessary. Then, the two rows and four columns of the sub-pixel PX coincides with 8 sub-pixels PX, so that the number of the occluded sub-pixel is 15832 (1080×4+5760×2−8).

In the step S120, deleting the pixel data having the same number of the occluded sub-pixels PX in the display area AA.

In general, when the display area AA needs to display the picture, providing the pixel data having the same number of the sub-pixel PX in the display area AA, each pixel data corresponds with a sub-pixel PX, so that the sub-pixel PX is displayed according to the corresponding pixel data. Thus, in the present embodiment, the number provided to the pixel data of the sub-pixel PX in the display area AA is 1920×1080. Due to the number of the occluded sub-pixel PX is 15832, deleting 15832 pixel data from the 1920×1080 pixel data is necessary.

Specifically, the method of implementing step S120 includes:

compared the pixel data corresponding to the two adjacent sub-pixels on the each pixel rows by the timing controller of the display panel or the System-on-a-Chip (SoC) of the display panel. Here, it is preferable that each sub-pixel PX is compared only once, but the present disclosure is not limited thereto. That is, on the same pixel row, comparing the corresponding pixel data by the order of the two-two sub-pixels PX.

When the pixel data corresponding to the two adjacent sub-pixels PX on the each pixel rows are the same, the timing controller of the display panel or the SoC of the display panel extracting and deleting one of pixel data, until the number of the extracted and deleted pixel data is 11520 (5760×2) or 11512 (5760×2−8), i.e. when the number of the extracted and deleted pixel data is equal to the number of sub-pixel on the occluded pixel row, stop the comparison process and the deletion process of above. If the number of the extracted and deleted pixel data is less than 11520 or 11512, the above-mentioned comparison process and the deletion process is continued. Thus, the timing controller of the display panel or the SoC of the display panel extracting and deleting the pixel data which number equal to the number of the sub-pixel PX on the occluded pixel row.

The timing controller of the display panel or the SoC of the display panel compares with the pixel data corresponding to the two adjacent sub-pixels on the each pixel columns. Here, it is preferable that each sub-pixel PX is compared only once, but the present disclosure is not limited thereto. That is, on the same pixel column, comparing the corresponding pixel data by the order of the two-two sub-pixels PX.

When the pixel data corresponding to the two adjacent sub-pixels PX on the each pixel columns are the same, the timing controller of the display panel or the Soc of the display panel extracting and deleting one of pixel data, until the number of the extracted and deleted pixel data is 4312 (1080×4−8) or 4320 (1080×4), i.e. when the number of the extracted and deleted pixel data is equal to the number of sub-pixel on the occluded pixel column, stop the comparison process and the deletion process of above. If the number of the extracted and deleted pixel data is less than 4312 or 4320, the above-mentioned comparison process and the deletion process is continued. Thus, the timing controller of the display panel or the SoC of the display panel extracting and deleting the pixel data which number equal to the number of the sub-pixel PX on the occluded pixel column.

In the step S130, integrated processing the undeleted pixel data, so that the undeleted pixel data are one-to-one correspondence with the un-occluded sub-pixels PX in the display area AA.

Specifically, the method of implementing step S130 includes:

Inserting a virtual data (dummy) or a black picture data with the same number of the occluded sub-pixel PX in the display area AA into the undeleted pixel data. That is, inserting 15832 virtual data (dummy) or black picture data in the undeleted pixel data.

integrated processing the undeleted pixel data and the inserted virtual data or black picture data, so that the inserted virtual data or black picture data are one-to-one correspondence with the occluded sub-pixels PX in the display area AA, and the undeleted pixel data are one-to-one correspondence with the un-occluded sub-pixels PX in the display area AA. That is, the 15832 virtual data (dummy) or black picture data are one-to-one correspondence with the 15832 occluded sub-pixel PX.

In the step S140, providing the integrated processed undeleted pixel data to the un-occluded sub-pixels PX in the display area AA, so that the aspect ratio of the picture displayed by the un-occluded sub-pixels PX in the display area AA is as same as the aspect ratio of the picture displayed by the all of the sub-pixels PX in the display area AA.

Specifically, providing the each inserted virtual data (dummy) or black picture data to the corresponding occluded sub-pixel PX, so that the occluded sub-pixel PX display virtual picture or black picture; and providing the undeleted pixel data to the un-occluded sub-pixel PX in the display area, due to the deleted pixel data is repeat the same pixel data, the picture of the undeleted pixel data and the original pixel data (i.e. deleted pixel data+undeleted pixel data) displayed are the same, so that the aspect ratio of the picture displayed by the un-occluded sub-pixels PX in the display area AA and the aspect ratio of the picture of the picture displayed by all of the sub-pixels PX in the display area AA are the same.

Figure 3:
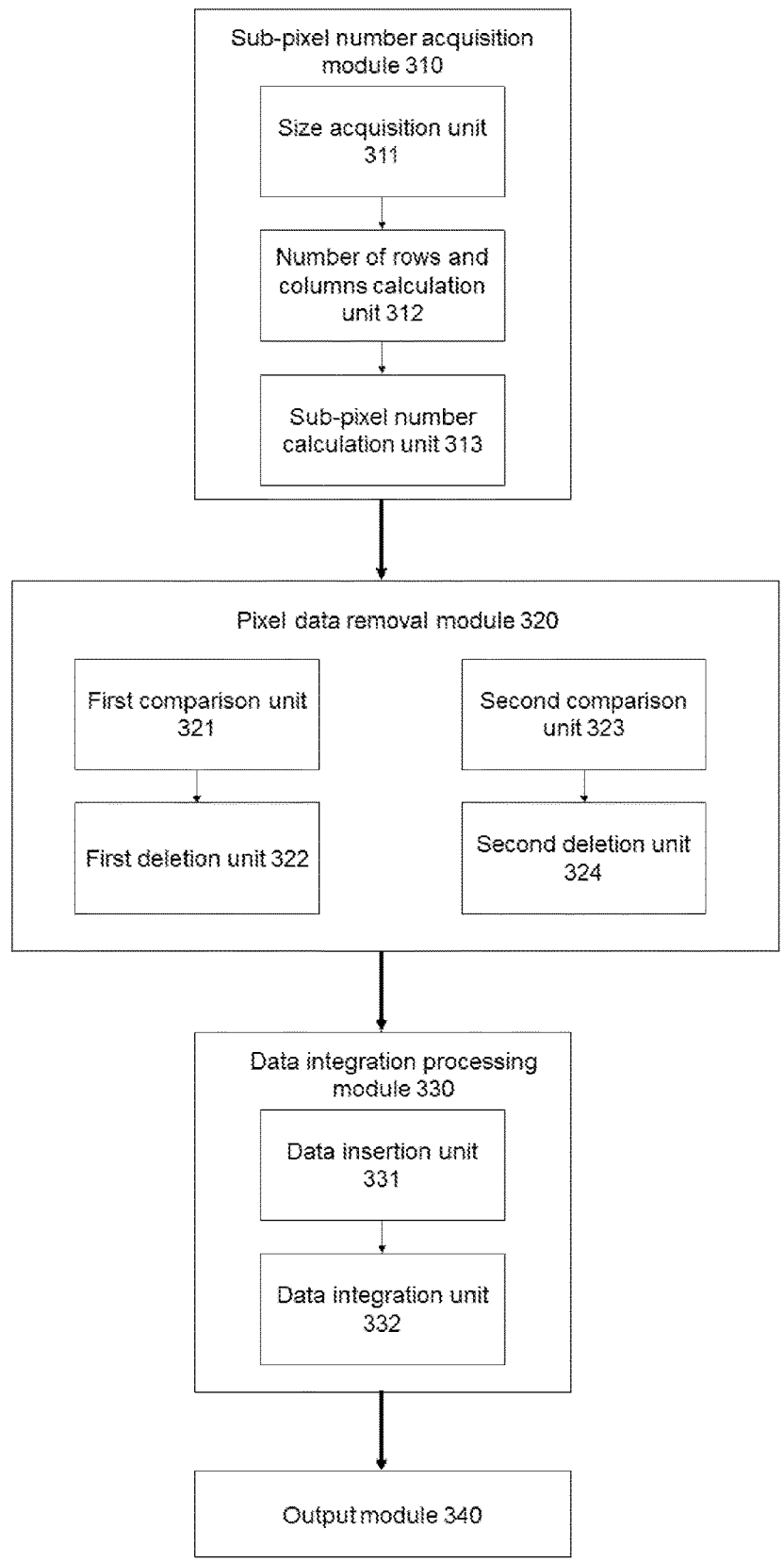
FIG. 3 is a module unit diagram of the picture compression apparatus of the display panel according to the embodiment of the present disclosure.

FIG. 3 is a module unit diagram of the picture compression apparatus of the display panel according to the embodiment of the present disclosure.

Refer to FIG. 1 and FIG. 3, the picture compression apparatus of the display panel according to the embodiment of the present disclosure includes: a sub-pixel number acquisition module 310, a pixel data removal module 320, a data integration processing module 330 and an output module 340. It should be noted that the picture compression apparatus of the display panel according to the embodiment of the present disclosure may be integrated in the timing controller of the display panel or the SoC of the display panel, but the present disclosure is not limited thereto.

The sub-pixel number acquisition module 310 is used to obtain the number of the occluded sub-pixels PX in the display area AA of the liquid crystal panel 10.

In the present embodiment, the sub-pixel number acquisition module 310 includes: a size acquisition unit 311, a number of rows and columns calculation unit 312 and a sub-pixel number calculation unit 313.

Specifically, the size acquisition unit 311 is used to obtain the width of the occluded pixel row area and pixel column area of the display area AA of the liquid crystal panel 10, and obtain the length and width of the sub-pixel PX in the display area AA of the liquid crystal panel 10;

That is, the size acquisition unit 311 obtains the width W1 of the occluded first pixel column area (which includes the area occupied by the first column sub-pixel PX and the second column sub-pixel PX), the width W2 of the occluded second pixel column area (which includes the area occupied by the 5759th column sub-pixel PX and the 5760th column sub-pixel), the width L1 of the occluded first pixel row area (which includes the area occupied by the first row sub-pixel PX) and the width L2 of the occluded second pixel row area (which includes the area occupied by the 1080th row sub-pixel PX), and the size acquisition unit 311 obtains the length L and the width W of the sub-pixel PX.

The number of rows and columns calculation unit 312 used to calculate the number of the occluded pixel row according to the width of the occluded pixel row area and the width of the sub-pixel PX, and calculate the number of the occluded pixel column according to the width of the occluded pixel column area and the length of the sub-pixel PX.

That is, the number of rows and columns calculation unit 312 calculates the number of the occluded pixel column by the width W1 of the occluded first pixel column area divided by the width W of the sub-pixel PX, i.e. two columns of the first column and the second column; the number of rows and columns calculation unit 312 calculates the number of the occluded pixel column by the width W2 of the occluded second pixel column area divided by the width W of the sub-pixel PX, i.e. two columns of the 5759th column and the 5760th column; the number of rows and columns calculation unit 312 calculates the number of the occluded pixel row by the width L1 of the occluded first pixel row area divided by the length L of the sub-pixel PX, i.e. one row of the first row; the number of rows and columns calculation unit 312 calculates the number of the occluded pixel row by the width L2 of the occluded second pixel row area divided by the length L of the sub-pixel L, i.e. one row of the 1080th row.

The sub-pixel number calculation unit 313 is used to calculate the number of the occluded sub-pixel according to the calculated number of the occluded pixel row and pixel column and the resolution of the liquid crystal panel 10.

That is, the resolution of the liquid crystal panel 10 is 1920×1080, i.e. in the display area AA, the number of the each column sub-pixel PX is 1080, and the number of the each row sub-pixel PX is 5760. Due to the intersection of one row sub-pixel PX and one column sub-pixel PX coincides a sub-pixel PX, subtracting the coincided sub-pixel is necessary. Then, the two rows and four columns of the sub-pixel PX coincides with 8 sub-pixels PX, so that the number of the occluded sub-pixel is 15832 (1080×4+5760×2−8).

The pixel data removal module 320 is used to delete the pixel data having the same number of the occluded sub-pixels PX in the display area AA.

In general, when the display area AA needs to display the picture, providing the pixel data having the same number of the sub-pixel PX in the display area AA, each pixel data corresponds with a sub-pixel PX, so that the sub-pixel PX is displayed according to the corresponding pixel data. Thus, in the present embodiment, the number provided to the pixel data of the sub-pixel PX in the display area AA is 1920× 1080. Due to the number of the occluded sub-pixel PX is 15832, the pixel data removal module 320 deletes 15832 pixel data from the 1920×1080 pixel data is necessary.

In the present embodiment, the pixel data removal module 320 includes: a first comparison unit 321, a first deletion unit 322, a second comparison unit 323 and a second deletion unit 324.

Specifically, the first comparison unit 321 is used to compare the pixel data corresponding to the two adjacent sub-pixels on the each pixel rows. Here, preferably the first comparison unit 321 just compares each sub-pixels PX, but the present disclosure not is not limited thereto. That is, on the same pixel row, the first comparison unit 321 compares the corresponding pixel data by the order of the two-two sub-pixels PX.

The first deletion unit 322 is used to delete one of the pixel data when the pixel data corresponding to the two adjacent sub-pixels PX on the each pixel rows are the same.

Until the number of the extracted and deleted pixel data of the first deletion unit 322 is 11520 (5760×2) or 11512 (5760×2−8), i.e. when the number of the extracted and deleted pixel data is equal to the number of sub-pixel PX on the occluded pixel row, stop the comparison process and the deletion process of above. If the number of the extracted and deleted pixel data of the first deletion unit 322 is less than 11520 or 11512, the above-mentioned comparison process and the deletion process is continued.

The second comparison unit 323 is used to compare the pixel data corresponding to the two adjacent sub-pixels PX on the each pixel columns. Here, preferably the second comparison unit 323 just compares each sub-pixels PX, but the present disclosure not is not limited thereto. That is, on the same pixel column, the second comparison unit 323 compares the corresponding pixel data by the order of the two-two sub-pixels PX.

The second deletion unit 324 is used to delete one of the pixel data when the pixel data corresponding to the two adjacent sub-pixels PX on the each pixel columns are the same.

Until the number of the deleted pixel data of the second deletion unit 324 is 4312 (1080×4−8) or 4320 (1080×4), i.e. when the number of the deleted pixel data of the second deletion unit 324 is equal to the number of sub-pixel PX on the occluded pixel column, stop the comparison process and the deletion process of above. If the number of the deleted pixel data of the second deletion unit 324 is less than 4312 or 4320, the above-mentioned comparison process and the deletion process is continued.

The data integration processing module 330 is used to integrate processing the undeleted pixel data, so that the undeleted pixel data are one-to-one correspondence with the un-occluded sub-pixels in the display area.

In the present embodiment, the data integration processing module 330 includes: a data insertion unit 331 and a data integration unit 332.

Specifically, the data insertion unit 331 used to insert the virtual data (dummy) or the black picture data with the same number of the occluded sub-pixel PX in the display area AA into the undeleted pixel data. That is, the data insertion unit 331 inserts 15832 virtual data (dummy) or black picture data in the undeleted pixel data.

The data integration unit 332 is used to integration process the undeleted pixel data and the inserted virtual data or black picture data, so that the inserted virtual data or black picture data are one-to-one correspondence with the occluded sub-pixels PX in the display area AA, and the undeleted pixel data are one-to-one correspondence with the un-occluded sub-pixels PX in the display area AA.

That is, the 15832 virtual data (dummy) or black picture data of the data integration unit 332 inserted are one-to-one correspondence with the 15832 occluded sub-pixel PX.

The output module 340 is used to provide the integrated processed undeleted pixel data to the un-occluded sub-pixels PX in the display area AA, so that the aspect ratio of the picture displayed by the un-occluded sub-pixels PX in the display area AA is as same as the aspect ratio of the picture displayed by the all of the sub-pixels PX in the display area AA.

Specifically, the output module 340 is used to provide the each inserted virtual data (dummy) or black picture data to the corresponding occluded sub-pixel PX, so that the occluded sub-pixel PX display virtual picture or black picture; and the output module 340 provides the undeleted pixel data to the un-occluded sub-pixel PX in the display area AA.

Due to the deleted pixel data is repeat the same pixel data, the picture of the undeleted pixel data and the original pixel data (i.e. deleted pixel data+undeleted pixel data) displayed are the same, so that the aspect ratio of the picture displayed by the un-occluded sub-pixels PX in the display area AA and the aspect ratio of the picture of the picture displayed by all of the sub-pixels PX in the display area AA are the same.

Otherwise, this application is a reference to the application method according to the present embodiment, the apparatus (system), and the flowchart and/or block diagram of a computer program to describe the product. It should be understood by the computer program instructions, and a combination of the flowchart and/or block diagram each process and/or blocks in the flowchart and/or block diagram of the process and/or box. These computer program instructions may be provided to a general purpose computer, special purpose computer, embedded processor or other programmable data processing apparatus to produce a machine, such that the instructions executed by a computer or other programmable data processing apparatus generating in the apparatus for implementing a process flow chart or a plurality of processes and/or block diagram block or blocks a specified function.

Otherwise, according to the each module or unit in the picture compression apparatus of the embodiment of the present disclosure may be implemented as hardware components. Depending on the processing performed by the defined individual modules or units, one skilled in the art may implement various modules or units, for example, field programmable gate arrays (FPGAs) or application specific integrated circuits (ASICs).

As described above, according to the embodiments of the present disclosure, the object of compressing the display picture can be achieved, thereby solving the problem that the incomplete picture displayed by the display area due to the mechanism frame covering the display area.

Although reference to particular embodiments shown and described the present disclosure, those skilled in the art will understand: without departing from the spirit and scope of the appended claims and their equivalents of the present disclosure, a case, in this that various changes in form and details.

What is claimed is:

1. A picture compression method for display panel, wherein, the picture compression method is configured to be applied for a display panel comprising a plurality of sub-pixels arranged to form a plurality of pixel columns and a plurality of pixel rows, a plurality of pixel data are provided for the sub-pixels, and the picture compression method comprises:
   obtaining a number of the sub-pixels that are occluded in a display area of the display panel;
   deleting some of the pixel data, wherein a number of the deleted pixel data is the same as the number of the occluded sub-pixels in the display area;
   integrated processing the pixel data that are undeleted, so that the undeleted pixel data are one-to-one correspondence with the sub-pixels that are un-occluded in the display area; and
   providing the integrated processed undeleted pixel data to the un-occluded sub-pixels in the display area, so that an aspect ratio of a picture displayed by the un-occluded sub-pixels in the display area is as same as an aspect ratio of the picture displayed by all of the sub-pixels in the display area,
   wherein, obtaining the number of the sub-pixels that are occluded in the display area of the display panel comprises:
   obtaining a width of an occluded pixel row area and an occluded pixel column area in the display area of the display panel, and obtaining a length and the width of one of the sub-pixels in the display area;
   calculating a number of the pixel rows that are occluded according to the width of the occluded pixel row area and the width of the one of the sub-pixels, and calculating a number of the pixel columns that are occluded according to the width of the occluded pixel column area and the length of the one of the sub-pixels; and
   calculating the number of the occluded sub-pixels in the display area according to the calculated number of the occluded pixel row, the occluded pixel column and a resolution of the display panel.

2. The picture compression method according to claim 1, wherein, the method of deleting some of the pixel data, wherein the number of the deleted pixel data is the same as the number of the occluded sub-pixels in the display area, comprises:
   comparing the pixel data corresponding to two adjacent ones of the sub-pixels on each of the pixel rows; and
   when the pixel data corresponding to the two adjacent sub-pixels on each of the pixel rows are the same, deleting one of the pixel data, until a number of the deleted pixel data equals to a number of the sub-pixels located on the occluded pixel row.

3. The picture compression method according to claim 1, wherein, the method of deleting some of the pixel data, wherein the number of the deleted pixel data is the same as the number of the occluded sub-pixels in the display area, comprises:
   comparing the pixel data corresponding to two adjacent ones of the sub-pixels on each of the pixel columns; and
   when the pixel data corresponding to the two adjacent sub-pixels on each of the pixel columns are the same, deleting one of the pixel data, until a number of the deleted pixel data equals to a number of the sub-pixels located on the occluded pixel column.

4. The picture compression method according to claim 1, wherein, the method of integrated processing the undeleted pixel data comprises:
   inserting a virtual data or a black picture data having a number the same as the number of the occluded sub-pixel in the display area into the undeleted pixel data; and integrated processing the undeleted pixel data and the inserted virtual data or black picture data, so that the inserted virtual data or black picture data are one-to-one correspondence with the occluded sub-pixels in the display area, and the undeleted pixel data are one-to-one correspondence with the un-occluded sub-pixels in the display area.

5. A picture compression apparatus of a display panel, wherein, the display panel comprises a plurality of sub-pixels arranged to form a plurality of pixel columns and a plurality of pixel rows, a plurality of pixel data are provided to the sub-pixels, and the picture compression apparatus comprises:
   a sub-pixel number acquisition circuit used to obtain a number of the sub-pixels that are occluded in a display area of the display panel;
   a pixel data removal circuit used to delete some of the pixel data, wherein a number of the deleted pixel data is the same as the number of the occluded sub-pixels in the display area;
   a data integration processing circuit used to perform integrated processing on the pixel data that are undeleted, so that the undeleted pixel data are one-to-one correspondence with the sub-pixels that are un-occluded in the display area; and
   an output circuit used to provide the integrated processed undeleted pixel data to the un-occluded sub-pixels in the display area, so that an aspect ratio of a picture displayed by the un-occluded sub-pixels in the display area is as same as an aspect ratio of the picture displayed by all of the sub-pixels in the display area,
   wherein, the sub-pixel number acquisition circuit comprises:
      a size acquisition circuit used to obtain a width of an occluded pixel row area and an occluded pixel column area of the display area of the display panel, and obtain a length and width of one of the sub-pixels in the display area;
      a number of rows and columns calculation circuit used to calculate a number of the pixel rows that are occluded according to the width of the occluded pixel row area and the width of the one of the sub-pixels, and calculate a number of the pixel columns that are occluded according to the width of the occluded pixel column area and the length of the one of the sub-pixels; and
      a sub-pixel number calculation circuit used to calculate the number of the occluded sub-pixels in the display area according to the calculated number of the occluded pixel row and the occluded pixel column and a resolution of the display panel.

6. The picture compression apparatus according to claim 5, wherein, the pixel data removal circuit comprises:
   a first comparison circuit used to compare the pixel data corresponding to two adjacent ones of the sub-pixels on each of the pixel rows; and
   a first deletion circuit used to delete one of the pixel data when the pixel data corresponding to the two adjacent sub-pixels on each of the pixel rows are the same, until a number of the deleted pixel data equals to a number of the sub-pixels located on the occluded pixel row.

7. The picture compression apparatus according to claim 5, wherein, the pixel data removal circuit comprises:
   a second comparison circuit used to compare the pixel data corresponding to two adjacent ones of the sub-pixels on each of the pixel columns; and
   a second deletion circuit used to delete one of the pixel data when the pixel data corresponding to the two adjacent sub-pixels on each of the pixel columns are the same, until a number of the deleted pixel data equals to a number of sub-pixels located on the occluded pixel row.

8. The picture compression apparatus according to claim 5, wherein, the data integration processing circuit comprises:
   a data insertion circuit used to insert a virtual data or a black picture data having a number the same as the number of the occluded sub-pixel in the display area into the undeleted pixel data; and
   a data integration circuit used to perform integration process on the undeleted pixel data and the inserted virtual data or black picture data, so that the inserted virtual data or black picture data are one-to-one correspondence with the occluded sub-pixels in the display area, and the undeleted pixel data are one-to-one correspondence with the un-occluded sub-pixels in the display area.

* * * * *